May 23, 1933.   B. SOUTHWELL   1,910,369
MEANS FOR RECORDING AND REPRODUCING SOUND BY THE USE OF CINEMA FILM
Filed Oct. 18, 1930
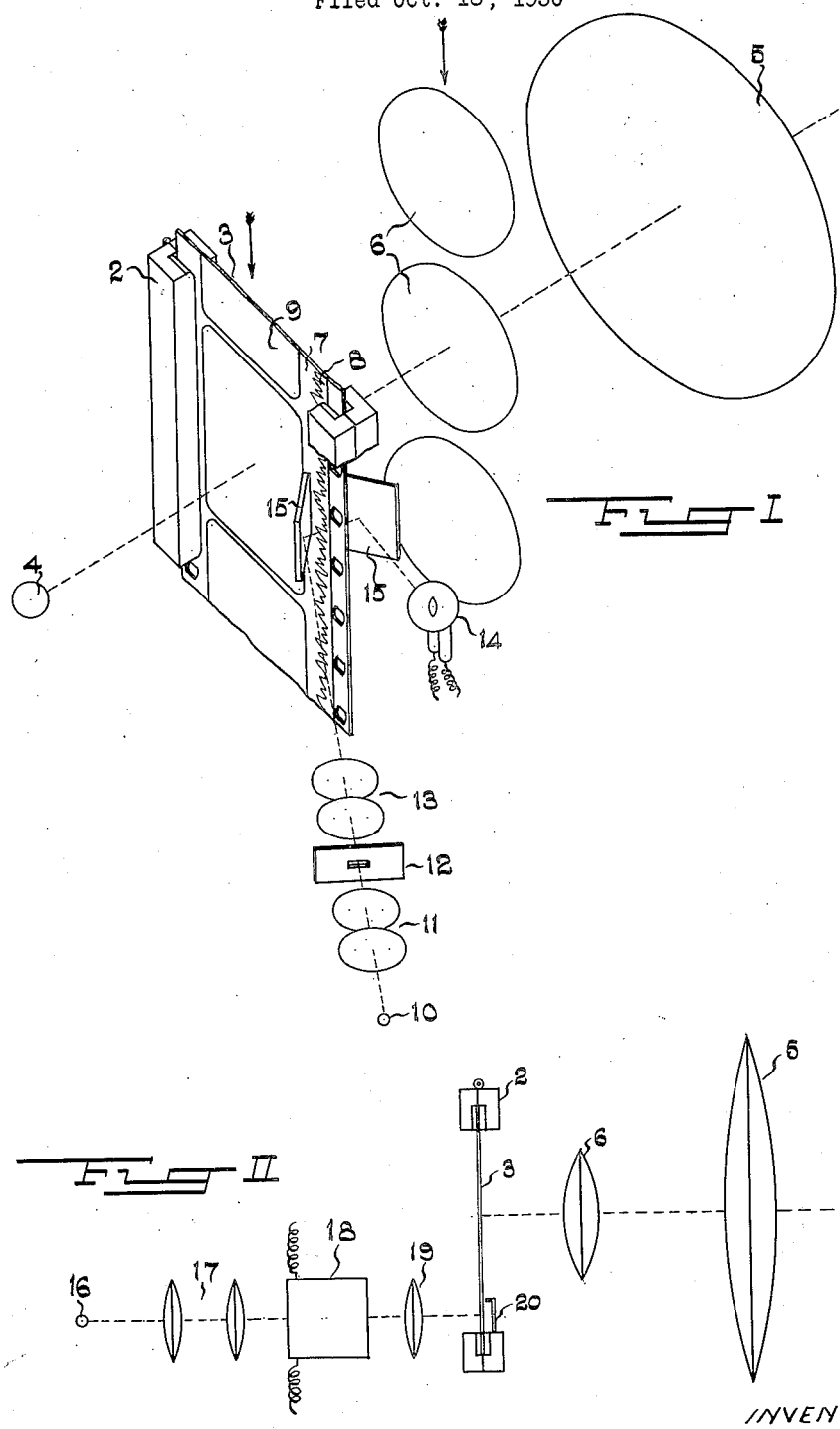
INVENTOR:
BAILEY SOUTHWELL
BY: Ruege, Boyer + Bakelar
ATTORNEYS.

Patented May 23, 1933

1,910,369

UNITED STATES PATENT OFFICE

BAILEY SOUTHWELL, OF JOHANNESBURG, TRANSVAAL, UNION OF SOUTH AFRICA

MEANS FOR RECORDING AND REPRODUCING SOUND BY THE USE OF CINEMA FILM

Application filed October 18, 1930, Serial No. 489,549, and in Great Britain October 31, 1929.

The present procedure in reproducing for sound-picture film is to pass the film step-by-step through the gate of a picture projector and thereafter to pass it with continuous movement through the gate of a sound producer spaced at some distance from the picture gate.

According to the present invention, in either reproducing or recording, the film is moved through the picture gate continuously, optical means being provided to compensate for the movement of the film; and the sound reproducing or recording apparatus is situated about the picture gate to co-operate with the correspondingly positioned portion of film. According also to this invention cinematograph film having a sound track, has the sound impression substantially at the side of the picture frame to which it relates.

The invention is illustrated in the accompanying diagrammatic drawing in which

Fig. I shows a reproducer, and
Fig. II a camera.

Referring to Fig. I, 2 indicates the gate through which the film 3 is moved continuously. The film is illuminated by a source of light 4 and its image is projected by optical means which compensates for the movement of the film. Various optical devices may be employed; those shown being of the kind described in Patent No. 1,768,772 and consisting of a fixed lens 5 and a series of lenses 6 one for each frame and moving with the film.

The sound track 7 is so positioned on the film that the sound impression such as 8 relatively to a particular frame such as 9 are substantially side by side. The sound reproducing apparatus shown is of the usual kind comprising a source of light 10 and a condenser 11, a mechanical slit 12, an objective 13, and a photo-electric cell 14. It is usually convenient to arrange the parts angularly to the film as shown and divert the light rays through the film by means of reflectors 15. In suitable cases the projector lamp 4 may be used as a source of light for the sound producer, the lamp 10 being dispensed with and the parts 11, 12, 13 being appropriately positioned.

Referring to Fig. II which is a sectional plan of a camera through the gate 2, 3 is the film and 5 and 6 indicate the optical system as before. The sound photographing apparatus comprises the lamp 16, the condenser 17, the slit valve 18 actuated by the sound modified electric current, and the objective 19 to project the illuminated image of the slit onto the film. 20 shows a cover for screening the sound track against light from the camera lenses. The sound photographing apparatus is shown arranged behind the film and projecting light onto the emulsion through the film base; and if it is desired to project the light directly onto the emulsion the parts may be arranged at the front of the film with a reflector if necessary to cause the light to fall perpendicularly onto the emulsion surface.

I claim:

1. A cinematograph machine for utilizing picture and sound film on which a continuous transparent sound track appears alongside a continuous series of pictures with the sound impression at the side of the picture frame to which it relates, comprising a gate, means to move the film continuously through the gate during picture exposure, optical means for compensating for such movement of the film, said optical means comprising a fixed lens and a series of moving lenses of which there is one for each picture frame and which move continuously with the film, and film sound apparatus positioned to co-operate with the film in the gate.

2. Cinematograph apparatus for projecting talking picture film having a sound record at the side of the picture to which it relates and comprising means for feeding the film continuously during picture exposure, optical means to compensate for the film movement, said optical means comprising a fixed lens and a series of moving lenses of which there is one for each picture frame and which move continuously with the film, a picture gate and a sound reproducing device which includes means to project a beam of light through the side of the film in the gate and a photo electric cell onto which the modified light falls, the optical axis of said sound reproducing device being arranged to a material extent laterally of the film and bent to pass through the film.

In testimony whereof I affix my signature.

BAILEY SOUTHWELL.